United States Patent
Hjertman et al.

(10) Patent No.: US 6,391,414 B1
(45) Date of Patent: *May 21, 2002

(54) STRUCTURE AND METHOD FOR JOINING PARTS

(75) Inventors: Birger Hjertman, Vällingby; Rudolf Cseke, Sollentuna, both of (SE)

(73) Assignee: Pharmacia AB, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,787

(22) Filed: Mar. 6, 1998

Related U.S. Application Data

(60) Provisional application No. 60/041,073, filed on Mar. 18, 1997.

(30) Foreign Application Priority Data

Mar. 7, 1997 (SE) ............................................. 9700817

(51) Int. Cl.[7] .............................. F16L 9/22; A61B 19/00
(52) U.S. Cl. ..................... 428/36.9; 428/36.92; 428/99; 428/100; 428/132; 428/133; 428/192; 428/34.1; 428/35.7; 138/120; 138/155; 138/166; 138/168; 206/223; 206/438; 206/571
(58) Field of Search .......................... 428/99, 100, 133, 428/36.9, 36.92, 192, 102, 132, 34.1, 35.7; 138/166, 168, 120, 155; 206/223, 520, 438, 571

(56) References Cited

U.S. PATENT DOCUMENTS 3,273,601 A * 9/1966 De Gain ....................... 138/166
3,757,031 A * 9/1973 Izraeli ......................... 174/138 F

FOREIGN PATENT DOCUMENTS

| EP | 0 437 909 | 1/1990 |
|---|---|---|
| EP | 0 448 329 | 3/1991 |
| FR | 1.236.806 | 9/1959 |
| GB | 2 257 464 | 1/1993 |
| JP | 59-64321 | 10/1982 |
| JP | 59-85713 | 11/1988 |
| TW | 281648 | 7/1996 |
| WO | 9700817-1 | 3/1999 |

OTHER PUBLICATIONS

Manufacturing Process, 6th Mei Ya Publication 1972.
Mechanical Parts Design, Shi Foundation, 1973 (As Attachment #2—No Title).
Forming Mechanics, Wen Jin Co., 1992. (As Attachment #3—No Title).

* cited by examiner

Primary Examiner—Rena L. Dye
(74) Attorney, Agent, or Firm—Gilberto M. Villacorta; Corinne M. Pouliquen; Katten Muchin Zavis

(57) ABSTRACT

The invention relates to an article of manufacture comprising a partial or complete tubular primary part defining a tube axis and having an at least partially curved circumferential wall at least partially encircling the axis; said wall comprising a joint edge, defining a) a joint line along said edge on said wall, b) a joint plane drawn to contain said joint line, c) a joining direction having at least a direction component perpendicular to said joint line and said joint plane, d) a locking plane at least partially at the surface or within a section through said wall in which both said joint line and said joining direction lies and e) a normal direction being perpendicular to said joint plane; and at least one locking structure, the improvement comprising that the locking structure includes at least one positive or negative hook structure in said locking plane, extending in the joining direction away from the joint line and having an undercut in the locking plane and that the hook structure is exposed from at least one side of the locking plane when viewed along the normal direction. The invention also relates to a method or joining such a primary part to a secondary part and joined such parts.

44 Claims, 5 Drawing Sheets

STRUCTURE AND METHOD FOR JOINING PARTS

RELATED APPLICATIONS

This application claims priority from U.S. Provisional Patent Application No. 60/041,073, filed Mar. 18, 1997, and Swedish Patent Application Number 9700817-1, filed Mar. 7, 1997, both of which are hereby incorporated by reference.

TECHNICAL FIELD

The present invention relates to an article of manufacture comprising a partial or complete tubular primary part defining a tube axis and having an at least partially curved circumferential wall at least partially encircling the axis; said wall comprising a joint edge, defining a) a joint line along said edge on said wall, b) a joint plane drawn to contain said joint line, c) a joining direction having at least a direction component perpendicular to said joint line and said joint plane, d) a locking plane at least partially at the surface or within a section through said wall in which both said joint line and said joining direction lies and e) a normal direction being perpendicular to said joint plane; and at least one locking structure, for mechanically connecting the joint edge to another joint edge on the first par or on another part. The invention also relates to a method for joining such a primary part to a secondary part and joined such parts.

BACKGROUND

Articles comprising parts of generally tube-shaped design have abundant uses, such as in conduits, containers, enclosures, protection sleeves, functional machine parts etc. A frequent problem is to join the tube-shaped part to similar parts or assisting or auxiliary components, such as other tube parts, end closures, handles, couplings, guiding structures etc.

Typical problems and requirements in joining tubular parts to secondary components for example is to secure both axial and angular immobility therebetween. It may be of interest to provide for either a releasable or a permanent locking of the parts, in the latter case perhaps with the additional requirement that an inadvertent or unauthorized release effort can be detected. The parts should be easily connected, either when joined manually or by machinery in automated production, and perhaps include guiding structures for proper orientation and alignment. It should be possible to join the parts either in free or predetermined angular relationship. The parts themselves should be easily produced and material selection as free and individual as possible. The demands become exaggerated when high demands are placed on purity, quality, tolerances and strength, where size limitations are severe, e.g. when internal or external dimensions are critical or when thin materials are involved.

Prior art methods do not meet all these requirements or even a more limited set of demands in specific situations or applications. Existing joining principles are basically of two types. Either a mechanical lock is provided in which physical structures on the parts engage to provide the fitting desired. Well known examples are common threads, bayonet couplings, snap locks etc. Typical examples are disclosed in JP 59-85713, GB 2 257 464, EP 437 909, EP 448 329, JP 59-64321 and DE 43 23 124. Common to such solutions is that the parts to be joined in some way overlap and build on lateral dimensions. In case of tube shaped components either inner or outer space has to be sacrificed, the former creating problem e.g. when articles of predefined shape are to be housed therein and the latter e.g. when the joined parts are to be accommodated in secondary devices of limited size. A uniform cross-section over length may be a requirement, e.g. in case of movable parts. Even when size is not a primary concern the overlap makes smooth transition sections and couplings difficult. Although problems of this kind may be cured by adding material to the extent necessitated by the widest part, such solutions may be entirely unsatisfactory with respect to cost, weight, component thickness, transparency and other considerations. The other main joining principle is to utilize gluing, welding, fusing etc., adhering the parts with material adhesion or consolidation, rather than structure. Proper use of such methods may provide joints with a design freedom corresponding to constructions in a single homogeneous or integral material. There are other severe limitations, however. The joint is irreversible and releasable fittings generally cannot be made. Material selection for the parts is highly restricted. Manufacture require advanced equipment and is time consuming in that heating, cooling, drying, hardening or curing steps are involved. The parts need fixture support during such steps until supportive strength has developed and still the joint area may contain potentially destructive stresses, inclusions and irregularities. Adhesives, melts and solvents are sources of contaminants and the common practice of grinding the final joint to specified tolerance and finish causes severe particle generation, unacceptable in high purity applications, as in connection with pharmaceutical products.

Accordingly there remains a need for improved joining methods and structures, better meeting the requirements exemplified hereinabove, especially in connection with tubular parts and components, and in particular methods and structures unifying the advantages of mechanical and material consolidating joining principles.

SUMMARY OF THE INVENTION

A main object of the present invention is to provide joining principles, including methods and structures, meeting the requirements and avoiding the abovesaid disadvantages of current technology. A more specific object is to provide such principles suitable when at least one of the parts to be joined has tubular characteristics. Another object is to provide such joining principles unifying the advantages of mechanical and material consolidating principles. Still another object is to provide such joining principles needing only mechanical locking of parts, yet providing advantages of material consolidating locking. Yet another object is to offer such principles not requiring overlapping parts or undue lateral dimension expansion. A further object is to offer such principles offering locking in axial, radial and annular directions. Another object is to offer such principles permitting either permanent or releasable locking. Still another object is to provide for simple and rapid joining, if desired with certain guiding of the parts to be joined to intended orientation. Yet another object is to offer principles suitable for joining also thin materials. A final object is to provide joining principles for parts of variable material selection, simple structural design and ease of manufacture.

These objects are reached with the characteristics set forth in the appended patent claims.

By basically utilizing a mechanical joining principle for the articles, structures and methods of the invention several of the abovesaid advantages and objects are reached. Clean and rapid joining without time delays or high fixture demands are possible, producing joints without unpredictable material faults or weaknesses. Material selection for the parts is highly selectable and individual. Permanent or releasable joints can be produced selectably simply by controlling access to the joining or locking structures. Use of hook structures as mechanical-locking means, in contrast to e.g. threads, facilitates locking in all directions such as axial, radial and angular and proper distribution may allow the structures to either key together in a single orientation or in multiple arbitrary orientations. It further allows rapid quick-lock designs requiring few or even a single joining step, highly appropriate for either manual or automated assembly. By positioning the critical hook structures, such as bend and undercut respectively, in the same plane as the joint line, lateral overlap of the parts or their respective joining structures is no longer needed. Hereby purely axial joining, as when using the material consolidation joining principles, is possible allowing assemblies with uniform cross-sections, smooth transition sections, minimum and maintained dimensions and optimal strength to thickness joints, also when joining parts of thin materials. This orientation of the joining structures also provides for a certain self-orientation and position stabilization of the parts during the assembly movement, which further serve to facilitate the mounting procedure. The structure orientation can easily be applied to curved or tubular surfaces and may then provide additional advantages of simple overall self-locking properties in the assembly. The surfaces parallel to the joint plane are free to use for auxiliary structures such as additional lock securing means, accesses for release movements or guides for further assisting in the connection moments. Generally the structures are simple and easily manufactured. If the structures on at least one of the parts to be joined are made flexible the most simple design is possible and the joining procedure strongly facilitated.

Further objects and advantages of the invention will be evident from the detailed description hereinbelow.

DEFINITIONS

As used herein the following words and expressions shall have the meaning indicated, unless otherwise explicitly specified in the text.

By "tubular" shall be understood a shape of an article part, that in section defines a section surface, that is curved, either continuous or discontinuous with segments joined at singularities, to such an extent as to form a unoccupied area enclosed by the complete sected surface or by the sected surface completed with a straight line to closed form when the sected surface is not in itself closed around an unoccupied area. It follows that part shaped as defined need not form a completely closed section surface but includes partial such shapes also, such as half pipes, quarter pipes and other partial pipes in the case of pipe shapes. It further follows that the section surface need not be rotation symmetrical but includes other shapes as well, such as polygonal, with varying degrees of continuous or discontinuous curvature etc.

By "tube axis" shall be understood a line perpendicular to the tubular shape section surface and crossing through the section plane within, and where applicable centered within, the unoccupied area of the section surface. The line may be straight, curved or angled depending on the shape of the tubular part in said perpendicular direction, as exemplified by a straight, bent or meandering pipe.

In respect of directional information related to the tubular part "axial" shall be understood to mean a direction parallel with the tube axis as defined, "radial" shall be understood to mean a direction parallel with a radius line crossing the tube axis and laying in the section plane, "tangential" shall be understood to mean a direction parallel with a tangential line to the section surface in the section plane and perpendicular to both the tube axis and the radial direction and "circumferential" shall be understood to mean a direction following a circumference curve joining tangential points in the section surface.

DETAILED DESCRIPTION

The present invention may be used for joining a great variety, and an indefinite number, of articles and structures. For the purpose of description it will be assumed that one part is a primary part to which at least one, but possibly several, secondary parts are joined. The primary and secondary parts need not be entirely separate but may be joined by other means than the hook structures to be discussed, e.g. by means of hinges serving to provide mobility therebetween. Although parts with flat joint planes (or flat parts) may be joined by use of the invention, there are some advantages in applying the invention to connections involving at least one tubular part, as defined, both because special benefits are exploited and because satisfactory joining methods hitherto have not been available for such parts. When a tubular part is present it will be assumed that the primary part is the tubular part whereas secondary parts can be either tubular or of any other configuration. As explained the tubular part need not be a complete tube as in a pipe for conducting fluid but may equally well be a partial pipe type construction. The tube need not have any particular symmetry or circumferential shape but can have any other kind of tubular circumferential shape although continuous curvatures and especially rotation symmetry is often preferred. Similarly, although the article may be tubular all over its axial length or a substantial part thereof, the minimum requirement is only that it is tubular at the section considered and may have shapes of other classes in the two axial directions extending from the section plane. Typical examples of tubular parts in the sense described, besides regular pipes, are closures, protection sleeves, sealings, gaskets etc.

The secondary part to be joined to the primary part may be similar or identical to the primary part alternatives described. For example, two or more pipe sections may be joined to make a longer structure or two partially tubular vessels may be joined opening to opening to form an enclosure for a content inserted before joint formation. The secondary part may be entirely different, however, and may for example include grips, attachments devices, connectors for various articles or machinery, guiding or steering structures etc. It is even possible that at least the positive part of the joining structures, to be more fully described below, acts as secondary part, for example when acting as an attachment or grip component. It follows that the secondary part need not be tubular but can be flat or have any other functional form although some advantages are obtained when both the primary and secondary parts are tubular, in particular with substantially equal cross-section at the joint.

Generally at least the primary part has an end or edge, at least a part of which is intended for joining to a secondary part. Also the secondary part may have a similar end or edge in which case the two edges are normally intended to face each other, under abutment or with a gap therebetween, over a common joint area in the final assembly. For purposes of description it is assumed that a "joint plane" can be placed at, or drawn through, the end or edge in such a way that it roughly faces the opposing part surface in the final joint and accordingly the visible "joint line" on the part surface come to lie within the plane. The plane may be roughly flat but may also be curved or bent with discrete angle folds, depending on how the end or edge of the part, to which the plane belongs, is cut. Yet, since the plane is primarily construed to include the said joint line, the plane need not exactly correspond to the end or edge surface or an exact part cross-section close to the end but the physical end may partially extend through or away from the plane and in particular shall not be intended to follow the complex hook structure contours to be described. Similarly the joint line may be straight on a flat surface but may also be curved or polygonal, a common pipe length for example ending in a joint plane normal to its axis will include a circular circumferential joint line. When reference is made to a "joint line direction" it will refer to a direction identical to or parallel with the joint line and it follows that such a direction may be straight or curved, notably circumferential. By a "joining direction" shall be understood a direction perpendicular to the joint plane. It may be thought of as the direction the respective joint planes of the parts has to be approached to each other in order to establish the joint when said approach is made with a decreasing gap between the planes. It need not correspond to the actual practical approach direction in the factual joining procedure, however, since such an actual approach may equally well be inclined in a "touching" manner or even in a "shearing" type manner in which two joint planes coincide in the first place and the part edges are brought into abutment with purely lateral movements within said plane.

For a primary part of the preferred tubular type the joint plane may run in two basically different ways, although various intermediates are possible. The joint plane may be axial to the tube so that the tube axis is parallel with or falls within the plane over the axial length considered. In this case the joint line may be parallel with the axis and straight in case of a straight tube or curved in case of a bent tube. The joining direction may be radial to the tube, subject to the possibility of using other actual joining movement directions as stated. This joint plane principle can be illustrated with two half pipe mantle surfaces being joined to a full pipe. The second basic principle is to orient the joint plane perpendicular to the tube axis so that the tube radiuses falls within the plane. In this case the joint line is a circumferential curve which may form a closed line in case of a full pipe. The joining direction may be axial, allowing for other actual approaches. This joint plane principle can be illustrated with two crescents or tube lengths being joined coaxially to a longer structure. One possible intermediate form is to orient the joint plane with an angle to the tube axis, e.g. giving an elliptical joint line from a circular pipe, which may be used for a variety of purposes including provision of an additional locking against angular movements, provision of a "knee" of predetermined or variable angle on an elongated part etc. Other possible intermediate forms are to use a flat or curved joint plane to cut out a segment or section part of tubular part. The above principles for defining the joint plane may apply also to the secondary parts to the extent these contains tubular components. Otherwise the diverse nature of conceivable such parts makes general statements about possible joint plane orientations impossible.

The primary and secondary parts as described shall comprise locking structures for keeping the parts in their intended relationship. Preferably the locking structures at least act to prevent part separation or movements in the joining direction, more preferably they also act to prevent movements in the joint line direction and most preferably they also act to prevent movements in the direction normal to both the joining direction and joint line direction. In order to perform these functions the locking structures shall comprise at least the hook structures to be described next, and possibly other auxiliary structures to be exemplified.

The locking structures of the parts to be joined shall preferably be designed so that a "locking plane" can be found at a surface of the part or a section through the part, said locking plane being placed so as to include the joint line within the plane, in which locking plane is delimited a hook structure designed to prevent the abovesaid separation movements, i.e. prevent at least separation in the joining direction. According to the invention the locking plane is arranged also to have at least a direction component in the joining direction and in many instances it is preferred that the locking plane extends substantially in said joining direction. This means that essential hook structures to be described will be oriented in said joining direction.

The minimum requirement on the hook structure in said locking plane is that it shall have an "undercut" in the sense of, in a single or composite shape, extending both in the joining direction and in the joint direction, e.g. by being angled in respect of these directions. This in order to secure that, when combined with a similar structure in a final joint, a separation force applied in the joining direction is opposed by the surfaces or surface components extending laterally in the joint direction. A simple form of such a structure is a "spike" extending in an oblique angle to the joint direction and the joining direction. The structure may have an about constant width, measured in the joint direction, over at least part of its extension, which may be utilized to allow for a short rotational joining movement in assembly, mimicking a partial screwthreaded movement, which may be performed without any deformation of the parts. If in this case rotational movements are to be prevented, two similar structures extending with different angles or with angles in different directions may be used, entirely different secondary structures may be used or the spike may be given a wavy, saw-toothed or irregular profile over joining direction extension to prevent withdrawal.

An in many instances preferred structure, e.g. for rotation prevention and self-locking options, is a "neck and head" type structure, having a "neck" part closer to the joint line with a first width, measured in the joint direction, and a "head" part farther away from the joint line having a second width, measured in the joint direction, which second width at least somewhere is larger than the first width. When combined with a similar structure in a final joint such neck and head structures prevents separation movements in the joining direction as the head cannot pass the neck width. Numerous neck and head type structure designs are conceivable. The structures may be substantially triangular with the wider part constituting the head and a tip part constituting the neck, similar to dovetails known as such in e.g. wood craft fittings. It is generally preferred, however, to make the distal, when seen from the joint line, head part somewhat protruding or convex, rather than flat or concave, in order to improve on self-guiding and self-stabilizing properties, one form of which may be illustrated by the rounded piece connections in a common jig-saw-puzzle. In order to reduce play and wedging effects in the joining direction it is preferred to have at least a. One form found to be of particular value in the above aspects is an arrow type shape, the arrowhead with its point distal constituting the head and the arrowshaft constituting the neck. The arrowhead may be substantially triangular whereas the arrowshaft may be straight or e.g. triangular, with its point connecting to the proximal base of the triangular arrowhead, for example to make the structure more symmetrical when seen from the proximal and distal ends respectively. Although the head may be connected in its distal end to one or more additional neck and head structures in the joining direction away from the joint line, e.g. in a wavy or saw-toothed manner, one neck and head structure is usually sufficient. In order to reduce play and wedging effects in the joining direction it is preferred to make at least a contour part of the hook structures substantially parallel with the joint line, especially the contour parts abutting at separating forces in the joining direction, i.e. proximal head parts when seen from the joint line. The arrowhead base, for example, may serve this purpose if comprising substantially straight parts parallel with the joint line.

To form a complete joint the hook structures need to come in two modes, a "positive" mode wherein the hook structures described are positive physical protruding parts on the primary or secondary part to which it is attached and a "negative" mode wherein the hook structures are cavity or recess parts formed in the primary or secondary part on which it is arranged, often also referred to as male and female parts respectively. The minimum similarity between the positive and negative shapes in the locking plane is that the negative part need to be large enough to accommodate the positive part. The negative part may, however, be larger and not necessarily uniform with the positive part, e.g. to facilitate assembly, to control relative and absolute flexibility of the hook respective structures, to save material or to provide manual or tool access for release of the hook parts. Even for such purposes, however, it may be desirable to make the mode parts at least somewhere with abutting or close points for control of play and tolerances, at least in the preferred locking directions as described. In many instances, however, it is preferred to make the make the positive and negative shapes substantially similar and uniform, e.g. for highest strength, best rigidity and security against release.

At least one hook structure of any mode, positive or negative, need to be arranged on a part designed for joining, although it is often preferred to arrange, symmetrically or asymmetrically, several hook structures on each part to be joined, e.g. to improve on uniformity, strength and self-locking properties. Although hook structures of entirely different overall design may be used for the individual hooks, e.g. to secure specific orientations or joining movements, it is mostly preferred to utilize several hooks of the same design for simplest overall construction or option of making the assembly in several orientations. With several hook structures on each part to be joined, various distributions of positive and negative mode structures are possible. Only one mode type may be present on each part, for example only negative parts on the primary part and only positive parts on a secondary part. Mixed positive and negative parts may be present on both parts to be joined. A special variety of the latter option is when the positive and negative structures on the same part are substantially identical, which makes also the parts to be joined substantially similar in respect of hook structures. A preferred embodiment of this option is to use symmetrical hook structures such that the separation between two positive hooks forms a negative hook of essentially the same shape, such as in a meandering cut of repeated identical protrusions and recesses. A final option is to join two parts both with the same positive or negative structure by use of an intermediate part having two structures of complementary mode structure, such as joining two parts with only positive structures by use of an intermediate piece with double negative cavities or two parts with only negative structures by use of an intermediate piece with opposing positive structures, although in this option the intermediate piece can also be regarded as a secondary structure to which a further secondary structure is joined in turn.

As explained, the critical hook details just described shall be present in at least the locking plane on both the primary and secondary parts. This enables the parts to be joined in such a way that the respective geometrical locking planes for the parts at least somewhere become substantially parallel and preferably fuses into one plane. As the locking planes have an extension in the joining direction, this principle secures that the complementary hook structures at least in the joined planes contributes with locking resistance against separation in the joining direction without need for overlapping hook structure parts in the lateral direction normal to the locking plane. This may be utilized for example with two parts of the same thickness to produce a joint of uniform thickness, with parts of different thickness at a joint of no larger thickness than the thicker part and with secondary parts of arbitrary form a joint utilizing the full thickness of the primary part for transition and strength.

Expressed in another way the advantages stated flows from the fact that the positive and negative critical parts described, such as the undercut or head and neck, will fall on the same line or surface when projected in the joining direction in the locking plane. Physically the positive structures will protrude with at least a direction component in the joining direction from the end or edge of the part to be joined and the negative structure as a cavity will intrude in the same direction on the other part. Normally the structures will be accessible at the ends of the parts to be joined, as a structure and openings respectively.

As a description tool the locking plane is meaningful primarily oven an area covering the hook structure extension in the joining direction and joint line direction, in the latter direction covering several different or repeated hook structures as described. Unless otherwise indicated the plane shall be understood to be limited in this meaning.

The locking plane as described may be flat, e.g. when the joint plane is axial on a tubular part having a polygonal cross-section and the joint line is placed on one of the straight sides. Generally it is preferred, however, that the locking plane is bent or curved, preferably continuously curved, which may be the case e.g. if at an axial joint plane the joint line is placed on a curved or folded part of the circumference or by necessity if the joint plane is perpendicular to the axis of a tubular part since in this case the locking plane to at least some extent will be curved or wrapped over the circumference and in case of a full tube the locking plane may be closed e.g. to a cylindrical form.

Joining of the hook structures may take place in several ways with corresponding structure requirements. The undercut or head and neck structures are designed to prevent separation in the joining direction. Still assembly in purely this direction is possible if the hook parts are resilient in the joint line direction in the locking plane to allow insertion of the positive part into the negative part through the accessible edge opening to the negative part cavity, e.g. by compressing the positive part or expanding the negative part by use of material plasticity or spring biased protrusions, which allow use of entirely closed negative parts. Yet for best strength of the final assembly and simple design it is preferred that the hook structures are essentially rigid against deformations within the locking plane, which in turn means that the positive and negative structure parts have to be joined in a lateral direction to the locking plane, i.e. with a movement having at least a component in the normal direction to the locking plane, preferably in such a way that corresponding structure parts of the positive and negative hooks come into engagement substantially directly. This normally requires that the hook parts each have at least one surface substantially parallel to the locking plane open or accessible for the other hook part so that the respective surfaces can be placed so as to face each other and then be moved into engagement in a direction normal to the locking plane. In particular, the negative part cavity need to be open to be accessible from said normal direction. If the parts are rigid against deflections in the normal direction to the locking plane, this joining principle can be used if the parts to be joined can be moved in the normal direction so as to engage the facing hook parts. This means that the parts are basically not moved in the joining direction during assembly but rather in a direction at least having a component in the normal direction to the locking plane. This is easily arranged for when having only one hook structure in the joint or when having several hooks on a substantially flat locking plane, or a locking plane without curvature along the joint line, since in the latter cases all the hooks can be engaged concurrently by the normal directed movement. If several hooks are arranged in a locking plane having a curvature along the joint line, assembly is still possible if the hook structures are projectable in the movement direction, e.g. two diametrically arranged hooks on a pipe having a cylindrical locking plane.

A preferred way of arranging for assembly is to make the hook structures flexible, and preferably elastic, in the normal direction to the locking plane, to allow the hooks to deflect laterally out of the locking plane, which provides for a high degree of versatility. For example, although the parts can be joined in the same manner as described above for rigid hooks, it will now also be possible to make the assembly by movements in the joining direction. This may take place for example by flexing the mating hook parts laterally out of the locking plane at least during passage of the undercut or head parts whereafter the hook parts may be brought back in the locking plane to complete the engagement. Preferably the hook are not only deflectable but also elastic with bias towards either the open and unengaged position, in which case an additional locking ring may be needed, or preferably to the closed or engaged position which gives snap-lock and self-locking properties. Several hooks can be joined on even a curved locking plane of arbitrary curvature where the several hooks also may serve to provide separation prevention in directions normal to the locking plane to be further explained below. At least one of the positive and negative hook parts should be made flexible in the stated manner or alternatively both may be flexible. The positive mode part can be flexible as such whereas the negative mode part may be made flexible by giving similar flexibility to the physical structures surrounding the negative hook part, i.e. the material in which the cavity is formed. Flexibility may be provided in manners known per se, e.g. by selecting a flexible material or by reducing the structure thickness or width, all along the hook structure or to specific parts thereof in order to control bending to desired locations, e.g. close to the attachment point to the part to be joined. Hook structures having a narrow part by definition in the joint line direction, such as the neck in head and neck hook types, automatically have a flex concentration here unless actively counteracted by variations in thickness or material.

The hooks as described are generally excellently suited to prevent primary and secondary part separation or movements in the joining and circumferential directions. However, special precautions may be needed to secure retention in the normal direction to the locking plane, hereinafter referred to as the "third" direction, and it is preferred that the locking structures includes means for this purpose. The hook structures by themselves provide such retention under certain conditions, for example in case of more than one hook arranged in a locking plane curved along the joint line. If in a joint of this kind a shearing type separation force is applied to the primary and secondary parts of the joint in a radial direction to a first hook the force will become tangential or at least partly tangential to, and accordingly blocked by, a second hook on the curved locking plane, provided only that the tangential directions to the locking plane at the first and second hooks are other than parallel to each other. Although at least two hooks are sufficient when positioned in the manner explained, it is generally preferred to use at least three and preferably more hooks when this method of movement locking in the third direction is relied upon. The several structures may be asymmetrically positioned but are preferably symmetrically arranged along the joint line, e.g. with 120 degree separation for three hooks on a full pipe tube part.

It is preferred to utilize additional features, other than the basic hook characteristics as described, for securing the third direction retention, either alone or as a supplement to hook means when arranged as described. Such additional features may either be entirely separate from the basic tube and hook structures or part of these basic structures. Known fixtures and joint fitting details may be used as separate features, such as locking rings, adhesives etc. although such means tend to invoke disadvantages of the general nature discussed in the introduction. A preferred separate means is to use a solid body insert in the tubular part interior, positioned at least where hooks are present but perhaps extending longer in the axial direction. If the body has a play to the tube inner wall less than the hook thickness in the radial or third direction it will efficiently prevent hook disengagement in the third direction. This option is of special value if the application for the tubular part is anyhow intended to contain an object, e.g. when the tubular part shall form a container for an object or embrace a sleeve etc., as in this case the locking is obtained without additional means or sacrifices.

Means may be provided on the primary or secondary parts, other than on the hook parts, for third direction retention. Surfaces may be provided on either part or both which are designed to overlap in the final assembly in such a way that the overlap prevents the parts from being mutually displaced in the third direction. At least two such surfaces may be needed to prevent separation in either of two opposing shearing directions. A feature of this kind is one or several hinges between the parts to be joined, which provides the option of avoiding overlaps entirely and even can be made in material of reduced thickness as known per se. If the parts to be joined have a certain elasticity the hinge function can also be provided by an overall deformation of the parts. The hinge will influence the joining movement to take place as a rotational movement around the hinge. For example, on tubular parts overlaps or hinges may be positioned along an axial line of the tube circumference, when the joint plane is axial, and on at least one point at the end circumference, when the joint plane is perpendicular to the tube axis.

Third direction release prevention may also be provided by the design of the hook structures themselves by including structures limiting the relative movement in the third direction between the positive and negative hook parts. When the joining movement between the hook parts is lateral, i.e. in the normal direction to the locking plane, the structures should prevent that the hook parts can travel longer than is required for engagement. This can generally be accomplished, also at very thin parts to be joined, by stop surfaces positioned either at the distal or the proximal end, when seen in the lateral movement direction, of either hook part. The stop surfaces may be arranged outside the inner or outer peripheral boundaries of the parts to be joined in an overlapping manner, which especially in case of parts of different thickness can be made without trade-off between strength and lateral dimensions if the structures are within the boundaries of the thicker part. A general method of providing stop surfaces, which can be used without building on lateral dimensions, is to utilize hook thickness, i.e. its extension in the normal direction to the locking plane or, in the present context, the third direction. The thickness may be utilized for these purposes by making at least a part of the hook contour in the locking plane with a narrowing profile when moving in the third direction, e.g. with an inclined straight, curved or saw-toothed profile, running with a general angle to the third direction to narrow and provide a wedging, or flat in case of terraced surfaces, stopping effect on the hook part at the desired level in the third direction. The narrowing character should be assured on at least one of the positive and negative parts of the hook but is preferably made on both in order to optimize the stopping contact surface.

The hook structure thickness may be utilized for other purposes than third direction locking. The distal, when seen in the moving direction in the normal direction to the locking plane during locking, surface of the positive hook part may be given a pointed or tapering, in one or two directions, such as on a boat hull, exterior for self-centering purposes relative the negative part cavity when the positive hook part is approached the negative hook part. Similarly the negative hook part may be given a widening profile towards the proximal cavity surface, and possibly also widening towards its opening at the part end, in order to assist in mutual centering of the parts during assembly. An alternative purpose is to use the thickness to provide snap-locking properties to prevent hook part separation after joint establishment, e.g. by making the surfaces widening or concave in the movement direction, which may be of value e.g. when using a separate intermediate hook structure part, when the hook parts are not elastic but have to be physically retained or as an assisting feature in third direction retention. An implicit final option or course is to make the hook contour profile substantially straight in the movement direction, e.g. to allow a free shearing type assembly movement as described or to prevent that forces with a component in the locking plane, such as parallel with the joint line or the joining direction, transform into a lateral deflecting force on the hook structures, if this is not considered desirable. The various designs described may be mixed and for example tapering surfaces may be used where needed for guiding purposes as described with other parts of the hook structures maintained straight for avoiding deflection forces as described. The hook structures may include other details such as a grip, opening or undercut for manual access or insertion of a tool for release purposes.

Although the hook structure profile in the thickness direction, normal to the locking plane, can have any shape, e.g. a head and neck type being rotational symmetric, such as with a ball head and cylinder neck, it is preferred that the hooks are generally flat with a larger maximum width in the locking plane joint line direction than maximal thickness in the normal direction to the locking plane. Preferably this ratio of width to thickness is larger than 1.5 and preferably larger than 2. Absolute dimensions are strongly dependent on the nature of parts to be joined and general values cannot be given.

The hook structures can be manufactured in any material such as metal, glass or plastic. As indicated they can be rigid in case a shearing type joining method is used or soft in case additional position securing means for the hooks are used in the assembly. Preferably at least one the hook structure modes, and most preferably both, are made of an elastic material in order to allow the lateral flexing joining method to be used, and in this case the preferred material is plastic, e.g. polymethylmethacrylate, polycarbonate, polyolefines, polystyrene, polyester etc. The hook structure can be manufactured separate from the parts to be joined, preferably at least the hook structures on the primary part are made integral therewith and most preferably the hook structures on both parts to be joined are integral with their respective parts. When integral the preferred manufacturing material is plastic, as exemplified above, and the manufacturing method may be any kind of molding although the structures may also be formed by cutting, milling, punching, stamping etc.

The various method for assembling the hook structures have been described in connection with the different movements for the parts to be joined and the hook parts. Generally the method based on lateral flexing of elastic hook parts are preferred and joining movements in the joining direction as defined. It is possible to use non-identical positive and negative shapes to provide for mobility in the final assembly. For example, if the negative head part is larger in the joint direction than the positive head part whereas the negative neck part is shorter than the positive neck part, the final joint will allow the joined parts to reciprocate between two extremes. If similar width adaptations are made in the joint line directions an angular or lateral mobility between extremes is possible. In many instances, however, it is preferred to have a substantially rigid joint and the tolerances in said directions should be small or nil. The parts to be joined generally each have an edge or end, and a corresponding joint plane, facing the other part in the assembly and it is possible to arrange the hooks so that said edges have a gap therebetween in the final joint and accordingly the joint planes are separated. Mostly it is preferred however that the hooks are arranged to keep the ends or edges in close or preferably at least somewhere abutting relationship, e.g. so that the joint planes at least touches and preferably coincides and the respective joint lines fuses.

The joining principles of the invention may be employed in any application where it is desirable to benefit from its advantages. As indicated in the introduction the invention is of special value in high demand applications. One preferred use is when the primary and secondary parts form a container, preferably a generally tubular container, and especially so when a solid part is contained therein. The solid part may in turn be a container for a content, such as a medical preparation or precursors for such a preparation. The solid part can with preference be syringe type ampoule or cartridge, containing one or several pistons for displacement of its content, and the container may in this case comprise an opening for a plunger and possibly an attachment for an outlet such as a needle. As an example, the invention has successfully been utilized on a container for a glass cartridge type ampoule for medical preparations intended to be used in a device, e.g. as disclosed in our copending application SE 9602611-7, incorporated herein by reference, comprising a dispensing mechanism for the ampoule content. Several of the advantages supplied by the invention are utilized in this application. Among these are particle free and clean manufacture and assembly, automated snap-lock assembly, a locking solid in the container, non-releasable locking unless visible destruction is made, angular locking to allow treaded engagement of a needle holder and a threaded plunger mechanism, uniform outer dimensions for minimized dispensing device size with permitted axial mobility between device and cartridge, unitary molding to provide all necessary guiding and fitting structures for the dispensing mechanism etc. Alternatively or in addition the principles of the invention may also be used to attach such an ampoule to the dispensing device, e.g. to its housing or to its dispensing mechanism, in which case the container ampoule can be regarded as the primary part and the dispenser device as a secondary part.

DETAILED DESCRIPTION OF THE DRAWINGS

Figure 1:
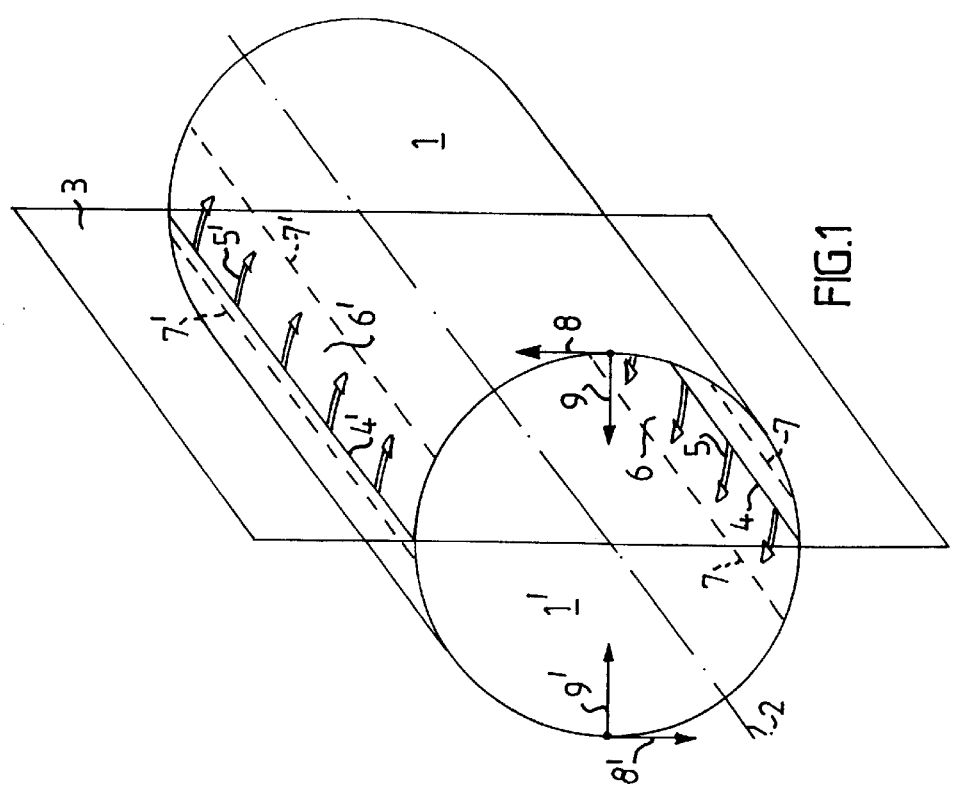
FIG. 1 shows in view a schematic representation of two tubular parts being joined at an axial joint plane.

In FIG. 1 are shown two tubular parts in the form of half pipes 1 and 1' being joined to a fill pipe with an axis 2 at a theoretical joint plane 3 in which the two joint lines 4 and 4' lie. Hook structures in the form of an array of schematic arrows 5 and 5' extend substantially in the joining direction as defined. Positive hook structures 5 are protruding from joint line 4 of half pipe 1 and 5' from joint line 4' of part 1'. Negative hook structure holes are arranged on part 1 at joint line 4' and on part 1' at joint line 4. The positive and negative structures are shown as assembled in curved locking planes 6 and 6', roughly delimited by dashed lines 7 and 7'. It can be noted that the joint line 4 is present in both the joint plane 3 and the locking plane 6 and joint line 4' in both joint plane 3 and locking plane 6'. To assemble or disassemble the full tube, the parts 1 and 1' can be moved in a shearing manner, as indicated by arrows 8 and 8', for a distance at least corresponding to hook thickness in these directions. This option is usable also for entirely rigid hooks. Alternatively assembly of the full tube can take place by moving the parts 1 and 1' towards each other, as indicated by the opposing arrows 9 10 and 9', in the joining direction as defined. In this option it is preferred that the hook structures are flexible so as to allow a lateral deflection thereof, in a direction normal to the respective locking planes 6 and 6', during passage of the positive arrowhead up to the negative arrowhead where these complementary structures may lock, preferably by flexing back into the locking plane. An alternative (not shown) is to remove entirely one of the locking planes, say 6', with its hook structures 5' and joint line 4' and replace it with either a hinge or nothing but a continuous part of the tube so that the two parts 1 and 1' actually are parts of the same pipe structure. Assembly and disassembly of the remaining hook structures 5 at joint line 4 in locking plane 6 can now take place by a rotating movement around the hinge or, in case no hinge is provided, by utilizing the flexibility of the tube material itself. Also in this joining alternative it is preferred that the hook structures are flexible as described. Hook flexibility can be provided by making flexible either the positive hook structures, the material between the negative hook structures or both.

Figure 2:
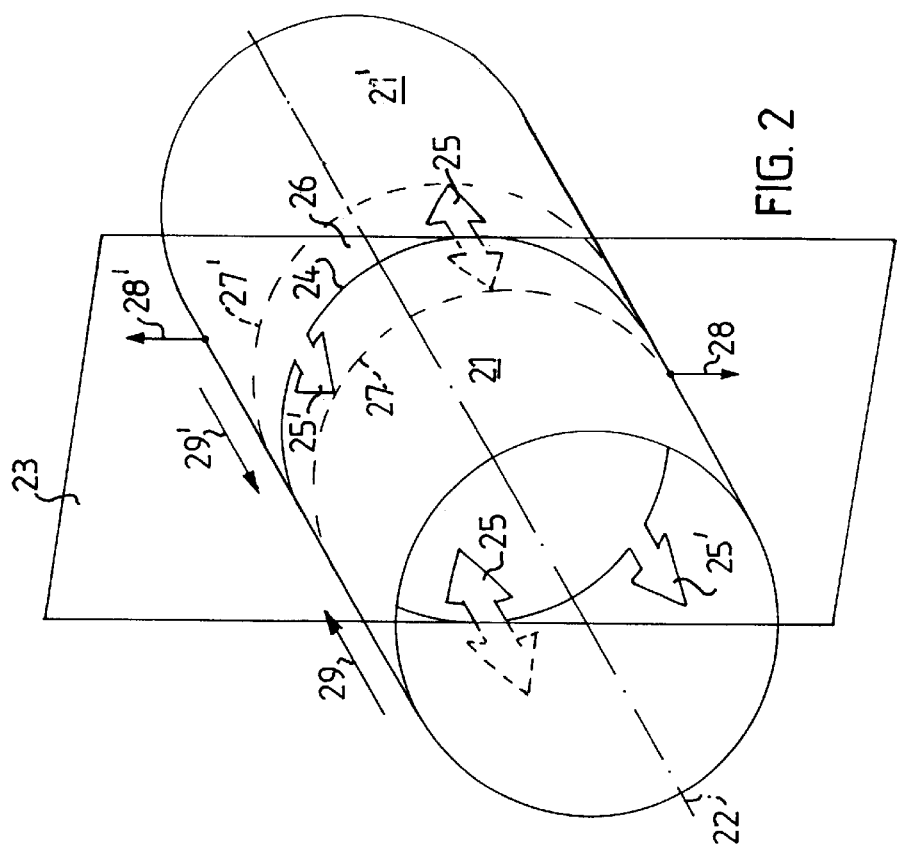
FIG. 2 shows in view a schematic representation of two tubular parts being joined at a joint plane perpendicular to the tube axis.

In FIG. 2 are shown two tubular parts in the form of two lengths of full pipes 21 and 21' being joined to a fill pipe with an axis 22 at a theoretical joint plane 23 in which a single 25 closed circular joint line 24 lie. Hook structures in the form of diametrical pairs of schematic arrows 25 and 25' extend substantially in the joining direction as defined. Positive hook structures 25 are protruding from joint line 24 of pipe length 21 and 25' from part length 21'. Corresponding negative hook structure holes are arranged on parts 21 and 21' and extending away from joint line 24. In the embodiment shown both part 21 and part 21' have both positive and negative structures although it is also possible that each part only have one mode type, illustrated by the phantom arrows shown as mirror reversed arrows 25. The positive and negative structures are shown as assembled in curved ring-shaped locking plane 26, roughly delimited by dashed lines 27 and 27'. Joint line 24 is present in both the joint plane 23 and the locking plane 26. To assemble or disassemble the full tube, the parts 21 and 21' can be moved in a shearing manner, as indicated by arrows 28 and 28', for a distance at least corresponding to hook thickness in these directions, provided that only one of the hook sets 25 or 25' are present or if at least the hook set 25 is flexible to allow lateral deflection in the radial direction until the positive and negative structures engage. Alternatively, and preferably, assembly of the full tube can take place by moving the parts 21 and 21' towards each other, as indicated by the opposing arrows 29 and 29', in the joining direction as defined. In this option it is preferred that the hook structures are flexible so as to allow a lateral deflection thereof, in a direction normal to the respective locking plane 26, during passage of the positive arrowhead up to the negative arrowhead where these complementary structures may lock, preferably by flexing back into the locking plane. When both the diametrically arranged hook sets 25 and 25' are present, the arrangement serve to prevent release not only in the joining direction circumferential directions but also in the third direction normal to the locking plane or in radial directions. If for example a shearing separating force according to arrows 28 and 28' is applied this force will be counteracted by hook structures 25 although not by hook structures 25'.

Figure 3A:
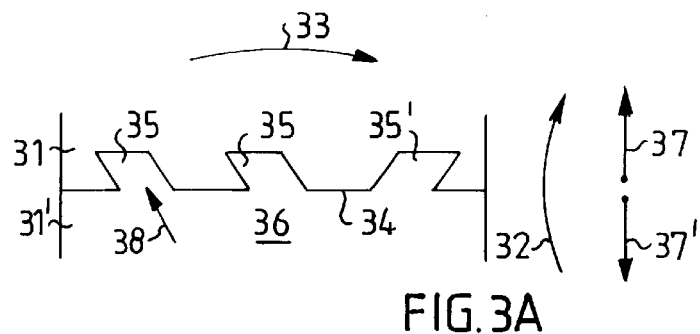
FIGS. 3A to 3F shows schematically different alternatives of hook structures.

FIGS. 3A to 3F shows schematically different alternatives of hook structures. In all the Figures it is assumed that an upper part 31 is joined to a lower part 31' along a joint line 34. What is shown in each Figure can be regarded as at least a part of the locking plane 36 although the locking plane may extend longer in the joint line direction. The locking plane 36 may be flat as shown in the figures but is in most applications curved, either in the joining direction, as exemplified in FIG. 1, indicated by arrow 32, or in the joint line direction, as exemplified in FIG. 2, indicated by arrow 33. In FIG. 3A the locking structures 35 and 35' are simple protrusions with constant width in the joint line 34 direction but inclined in respect of both the joint line direction and the joining direction to hereby form an undercut against separation forces in the joint line direction, as illustrated by arrows 37 and 37'. If only hook structures with similar inclination, as illustrated by the two hook structures 35, are present the, parts 31 and 31' can be joined by a similarly inclined movement, as illustrated by arrow 38, which movement is either straight, curved or rotational depending on the locking plane curvature as described. If also other hook structures of different inclination, as illustrated by the single hook 35', is present locking and unlocking by inclined movements alone is not possible. Generally all the hooks in FIG. 3A to 3F can be joined either by a shearing type of relative movement between parts 31 and 31' in directions perpendicular to the paper, subject to the curvature of the joint plane 36 as more fully described in relation to FIGS. 1 and 2, or by movements in the joining direction 37 and 37' by use of flexible hooks able to deflect laterally in said perpendicular direction.

Figure 3B:
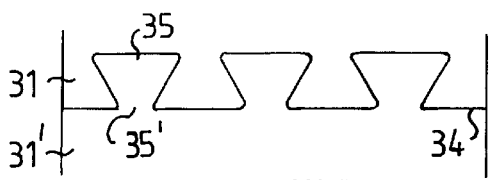

In FIG. 3B the hook structures are of the head and neck type, having in the joint line direction a wider head part 35 and a narrower neck part 35'. The hook structures are here symmetrical in the sense that the space between two positive hook parts forms a negative hook part of the same shape as the positive hook part so that the final joint contour will be regularly meandering and the joined parts 31 and 31' will have symmetrical edges or ends at the joint line.

Figure 3C:
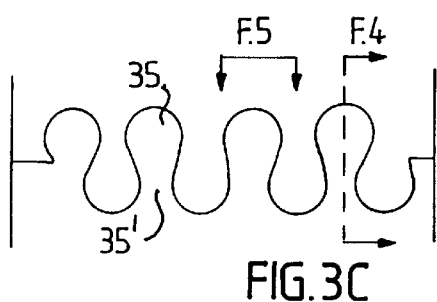

In FIG. 3C shows hook structures having heads 35 and necks 35' but with rounded protruding heads 35 facilitating assembly. The structures are symmetrical in the same sense as described in relation to FIG. 3B.

Figure 3F:
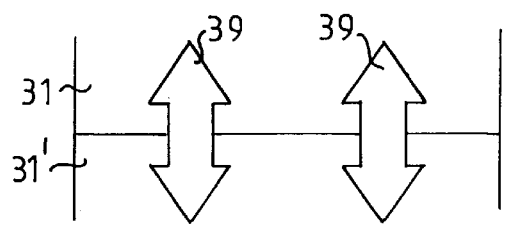
Figure 3D:
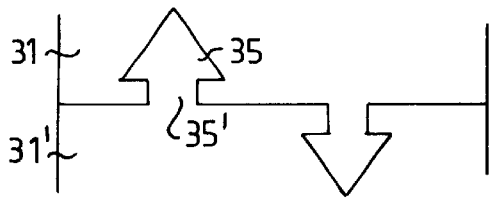

In FIG. 3D the hook structures have a head 35 and a neck 35' but are generally shaped as arrows which has proven to facilitate assembly. Although these structures are not symmetrical in the above sense it is here illustrated that both the part 31 and the part 31' can have both positive and negative hook structures. As shown the arrowhead base, i.e. the arrowhead part closest to the joint line, has parts parallel with the joint line to give most rigid abutment against separating forces in the joining direction.

Figure 3E:
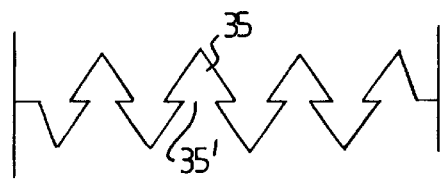

In FIG. 3E the preferred arrow type hook structure, with head 35 and neck 35', has been modified to a symmetrical contour as explained.

In FIG. 3F both part 31 and part 31' have only negative hook structures and are joined by use of intermediate pieces 39 having two opposing positive hook parts of general arrow shape.

Figure 4A:
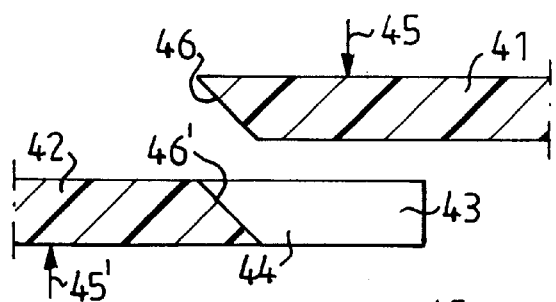
FIGS. 4A to 4D shows a cross-section view through a hook structure, as shown in FIG. 3C, illustrating various shape alternatives for hook structure thickness extension.
Figure 4B:
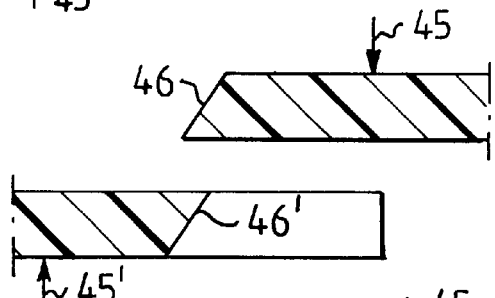
Figure 4C:
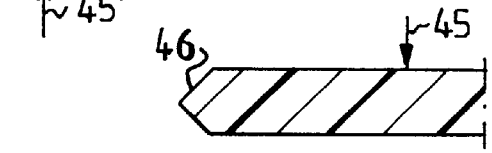

FIGS. 4A to 4D shows a cross-section view through a hook structure, as shown in FIG. 3C, illustrating various shape alternatives for hook structure thickness extension. In the Figures position 41 is the positive hook structure and 42 the negative structure, having a cavity with a narrower neck 43 to the right and a wider head part 44 to the left. In all Figures the positive and negative structures are supposed to be joined in direction of arrows 45 and 45', representing either a shearing assembly movement as explained or the last part of an assembly movement involving lateral hook structure flexing, just before the structures flexes back to complete the locking operation. In FIG. 4A the thickness dimension of the parts have been given a mating tapering cross-section so that the part surfaces 46 and 46' come in contact in the last part of an assembly movement in direction of arrows 45 and 45'. This may serve the purpose of acting as a stop against further movements in the third direction as described but the tapering front 46 of the positive hook structure may also facilitate lateral deflection of a flexible hook during the early stages of a assembly movement in the joining direction. In FIG. 4B the front surfaces 46 and 46' have been given a tapering section reverse to that of FIG. 4A, which may be used to provide a locking against release, after overcoming the entrance resistance at assembly. FIG. 4C shows a double-tapering section forming mating pointed sections within the thickness boundaries of the hook structures, which may serve to prevent movements in both lateral directions, after overcoming the entrance resistance at assembly.

Figure 4D:
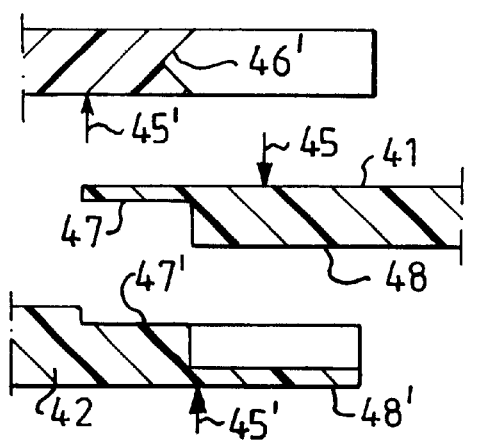

FIG. 4D with flat stop surfaces serving to prevent further movement perpendicular to the joint plane after that the hook structures have come into engagement. Although a single stop surface construction may be sufficient, two are illustrated. A first stop surface 47 on the positive part 41 is intended to come to rest on stop surface 47' on the negative part 42, which surface 47' is found on a cut-out in the part 42 to preserve lateral dimensions in this direction. A second stop surface 48' on the negative part 42 provides a stop against a complementary surface 48 on the positive part 41, which stop surface construction 48' here lies outside the common thickness boundaries of the parts. Further cut-outs and stop surfaces may be provided to give a terraced type of cross-section. Stop surfaces of the types shown in FIG. 4D may be provided also on the embodiments of FIGS. 4A to 4C in order to control lateral movements. It is clear that other parts of the hook structure contour than the front part can be given the modifications shown. They may also have other profile than straight, e.g. curved, saw-toothed or terraced.

Figure 5A:
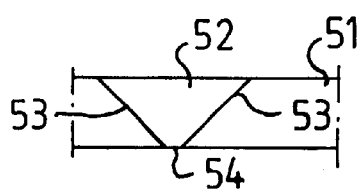
FIGS 5A and 5B shows a front view of a hook structure, as shown in FIG. 3C, illustrating various shape alternatives for the hook structure thickness extension.
Figure 5B:
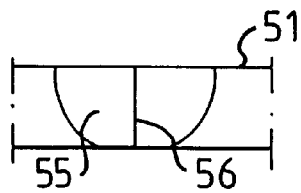

FIGS. 5A and 5B shows a front view of a hook structure, as shown in FIG. 3C, illustrating various shape alternatives for the hook structure thickness extension when seen from their front. In the Figures position 51 indicate one of the parts to be joined from which protrudes a positive hook structure 52 towards the viewer. Over its thickness the hook 52 has downwards tapering sides 53 narrowing towards point 54. The design may serve to facilitate self-centering of the positive and negative parts when approached during assembly, either the joining movement is of the shearing type or is based on lateral flexing, in which latter case the narrow neck part may be the opposing guiding structure. In FIG. 5B a similar design has curved sides and line 56 indicate that the front may also taper rearwards, as in FIG. 4A, to form a boat hull type body. The guiding structures may be present all over hook structure length or may be limited to its front parts, e.g. with otherwise maintained normal contour surfaces to avoid displacing hook structure movement components at forces in the joining and joint line directions.

Figure 6A:
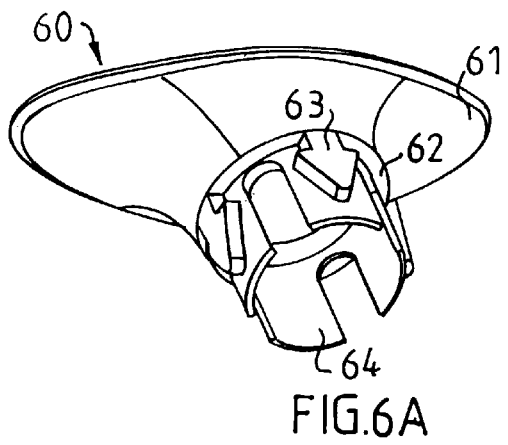
FIGS. 6A to 6C show in view and section an embodiment with a fingergrip part as shown in FIG. 6A and a sleeve part as shown in FIG. 6B, joinable to create an enclosure for an cartridge with functional details as shown in FIG. 6C.
Figure 6B:
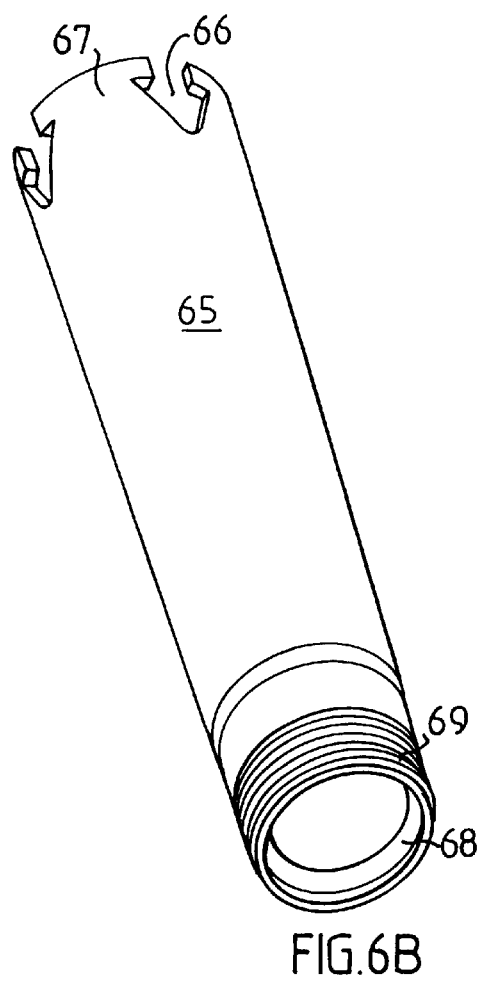
Figure 6C:
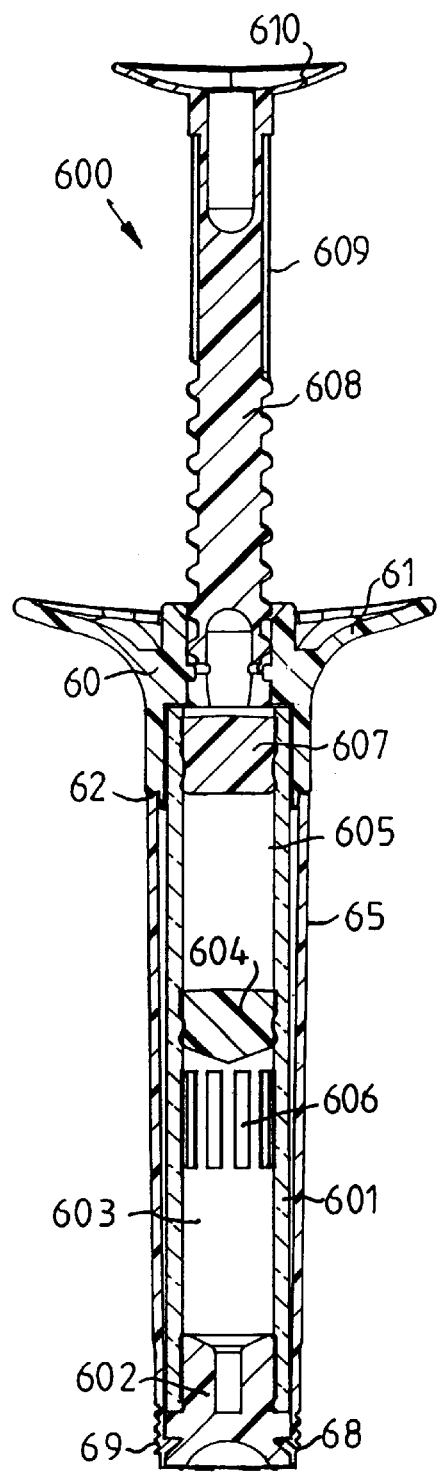

FIGS. 6A to 6C show an embodiment in which the principles of the present invention is applied to an injection device as generally described in U.S. Pat. No. 5,435,076 or EP patent 596 089, incorporated by reference herein. Generally a fingergrip part as shown in FIG. 6A and a sleeve part as shown in FIG. 6B are joined to create an enclosure for a dual-chamber cartridge, with functional details, as shown assembled in FIG. 6C. In FIG. 6A position 60 denotes the fingergrip closure having wings 61 for the actual fingergrip having a ring-shaped edge or end 62 for abutment to the sleeve. From edge 62 protrudes four arrow-shaped positive hook structures 63, symmetrically disposed around the edge circumference. Positive hook structures 63 inwardly terminates in stop surfaces 64, serving to give assembly movement guidance and stability contribution. In FIG. 6B sleeve part 65 in its upper end or edge, for abutment against fingergrip edge 62, has four recesses 66 forming arrow-shaped negative hook structure counterparts to positive hook structures 63. The edge portions 67 between two consecutive hook parts 66 can be regarded as positive complementary hook parts. In the sleeve 65 lower end as shown in the drawing an inner abutment rim 68 for the cartridge 20 is shown and an outer thread 69 for attachment of a needle or other outlet from the cartridge. Fingergrip 60 can be assembled with sleeve 65 by pushing the parts coaxial together after roughly centering arrowheads of 63 with arrowshaft of 66 and with stop surfaces 64 slightly inserted into sleeve part 65 interior. When axial force is applied the arrow design act to fully center arrowheads with the complementary arrowshaft recesses and the positive arrows 63 are deflected inwardly and/or the intermediate parts 67 between negative arrows 66 are deflected outwards to allow passage of the wide arrowheads of 63 under the narrow arrowshaft passages of 66 until the deflected parts can click back to full engagement between the mating parts. As intended the parts are now difficult to separate without permanent damage to the parts and more so with the solid insert, preventing inward deflection of positive hook parts 63 and any bending of the assembly. FIG. 6C shows a complete assembly 600 with the fingergrip part 60 connected to the sleeve part 65 as just described after insertion of a cartridge in the sleeve. The fingergrip part 60 now forms a closure for sleeve 65 with its content and at the edge 62 thereof the fingergrip 60 forms an uninterrupted continuation of the sleeve 65 exterior mantle surface. In the embodiment shown the cartridge comprises a glass ampoule 601, having a penetrable stopper 602 at its lower end, resting against abutment rim 68, a lower chamber 603 for a solid preparation, a lower piston 604, separating the ampoule into lower and upper chambers, the upper chamber 605, containing a solvent for the lower chamber solid, a by-pass section 606, for solvent overflow to the lower chamber 603, and an upper piston 607 closes the upper chamber 605. A plunger 608 engages internal threads in the fingergrip 60 and the threads may continue in a straight section as known per se and end in a push button 610. The plunger 608 may be assembled together with, before or after attachment of the fingergrip 60 to the sleeve 65. The device can be used in a manner known per se, i.e. the threaded plunger 608 can be rotated to advance upper piston 607 until lower piston 604 has moved to the by-pass 606, the solvent has been forced into the lower chamber and upper and lower pistons have come into contact. The dissolved preparation may then be ejected through a needle or other outlet (not shown) inserted through penetrable stopper 602 by a further straight movement of plunger 608.

Figure 7A:
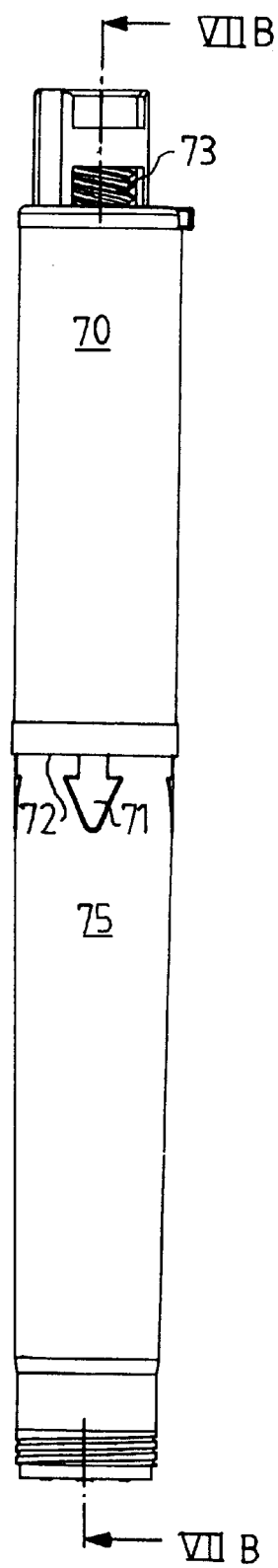
FIGS. 7A and 7B show in view and section an embodiment with two tubular parts joinable to create an enclosure for a cartridge similar to that shown in FIG. 6.
Figure 7B:
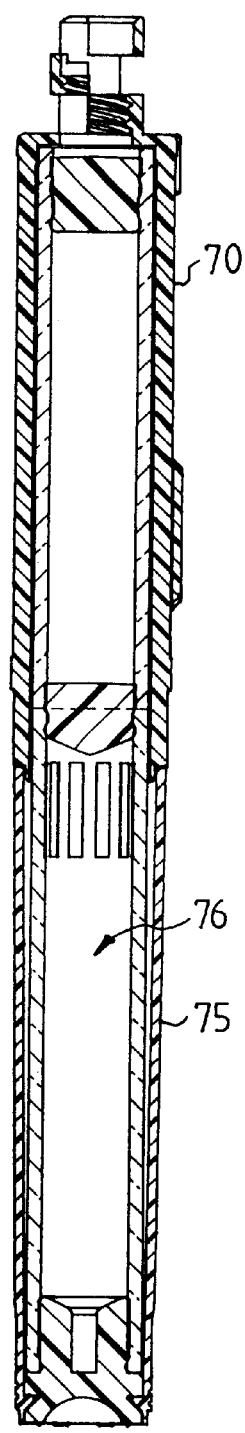

FIGS. 7A and 7B show in view and section an embodiment with two tubular parts joinable to create an enclosure for a cartridge similar to that shown in FIG. 6. The assembled product is usable in an injection device as disclosed in the abovementioned patent application SE 9602611-7. In FIG. 7A position 70 denotes an upper cylindrical part with positive arrow-shaped hook structures 71 protruding from joint line 72 and which hook structures are arranged on interior stop surfaces (not shown) similar to those at position 64 of FIG. 6A. A threaded arrangement 73 at the opposing end serve to accommodate a threaded and motorized plunger. The lower cylindrical part 75 is identical to the sleeve 65 of FIG. 6, the features of which shall not here be repeated. As in FIG. 6 the lower cylindrical part 75 has negative hook structure parts corresponding to, and engaged with, positive hook structures 71. As seen in FIG. 7B the upper 70 and lower 75 cylindrical parts are joined to form a container in which is inserted a dual chamber cartridge, generally designated 76, with the same functional details as described with positions 601 to 610 in FIG. 6C, although the cartridge 76 is slightly longer than the cartridge of FIG. 6, corresponding roughly to the additional space in upper cylindrical part 70 compared to the fingergrip closure 60. It can be noted that the waist area around joint line 72 is smooth with substantially constant width, e.g. allowing sliding movement for the assembly in a receptacle of closely fitting dimensions.

What is claimed is:

1. An article of manufacture comprising a partial or complete tubular primary part defining a tube axis and having an at least partially curved circumferential wall at least partially encircling the axis; said wall comprising a joint edge, defining a) a joint line along said edge on said wall, b) a joint plane drawn to contain said joint line, c) a joining direction having at least a direction component perpendicular to said joint plane, d) a locking plane, at least partially at the surface or within a section through said wall in which both said joint line and said joining direction lies and e) a normal direction being perpendicular to said joint plane; and at least one locking structure, characterized in the improvement comprising that the locking structure includes at least one positive or negative hook structure in said locking plane, extending in the joining direction away from the joint line and having an undercut in the locking plane and that the hook structure is exposed from at least one side of the locking plane when viewed along the normal direction and that the joint plane of the primary part is substantially perpendicular to the axis or intermediate between perpendicular and axial and that at least one of the hook structures is arranged to provide locking in the axial, circumferential and normal directions.

2. The article of claim 1, characterized in that the undercut is a neck and head type structure, having a neck part closer to the joint line with a first width, measured in the joint direction, and a head part farther away from the joint line having a second width, measured in the joint direction, which second width at least somewhere is larger than the first width.

3. The article of claim 2, characterized in that the head part has a distal, when seen from the joint line end being protruding or convex.

4. The article of claim 3, characterized in that the head part has arrow shape, the arrowhead, with its point distal, constituting the head and the arrowshaft constituting the neck.

5. The article of claim 1, characterized in that more than one hook structure is arranged along the joint line.

6. The article of claim 5, characterized in that the hook structures are arranged symmetrically along the joint line.

7. The article of claim 5, characterized in that only one positive or negative mode type is present on the primary part.

8. The article of claim 5, characterized in that both positive and negative hook structures are arranged on the primary part.

9. The article of claim 8, characterized in that the positive and negative hook structures are substantially similar in shape to form symmetrical hook structures.

10. The article of claim 1, characterized in that the locking plane is bent or curved.

11. The article of claim 10, characterized in that the curvature is continuous.

12. The article of claim 1, characterized in that the hook structure is flexible and deflectable in the normal direction laterally out of the locking plane.

13. The article of claim 12, characterized in that the hook structure is elastic with bias towards the locking plane.

14. The article of claim 1, characterized in that the primary part has a stop surface at least partly overlapping the hook structure when seen in the normal direction.

15. The article of claim 1, characterized in that the hook structure at least somewhere has a profile, when moving in the normal direction, which is inclined, curved or sawtoothed.

16. The article of claim 1, characterized in that the hook structures are generally flat with a larger maximum width in the locking plane joint line direction than maximal thickness in the normal direction to the locking plane.

17. The article of claim 1, characterized in that the primary part is rotation symmetric at the joint line.

18. An article of manufacture comprising at least one primary part and at least one secondary part; at least the primary part being partially or completely tubular defining a tube axis and having an at least partially curved circumferential wall at least particularly encircling the axis; the secondary part having at least a body or wall part; said wall of the primary part and secondary part comprising a joint edge, defining (a) a joint line along said edge on said wall, (b) a joint plane drawn to contain said joint line, (c) adjoining direction having at least a direction component perpendicular to said joint line and said joint plane, (d) a locking plane at least partially at the surface or within a section through said wall in which both the joint line and the joining direction lies and (e) a normal direction being perpendicular to said joint plane; the primary part and the secondary part having locking structures and being joined or forming a kit for being joined mechanically by engagement of said locking structures, characterized in the improvement comprising that the primary part comprises at least one positive or negative hook structure and the secondary part comprises at least one complementary positive or negative hook structure, that on each respective primary and secondary parts the hook structure is arranged in the locking plane, extending in the joining direction away from the joint line and having an undercut in the locking plane, that on each respective primary and secondary parts the hook structure is open from at least one side of the locking plane when viewed along the normal direction, that the engaged locking structures on the primary and secondary parts have at least partially coinciding respective locking planes, that the joint plane of the primary part is substantially perpendicular to the axis or intermediate between perpendicular and axial and that at least one of the hook structures is arranged to provide locking in the axial, circumferential and normal directions.

19. The article of claim 18, characterized in that the joint plane of the primary part is substantially axial.

20. The article of claim 19, characterized in that the primary part and secondary part are partial pipes joined to a full pipe tubular part.

21. The article of claim 18, characterized in that the joint plane of the primary part is substantially perpendicular to the axis.

22. The article of claim 18, characterized in that the undercut is a neck and head type structure, having a neck part, closer to the joint line with a first width, measured in the joint direction, and a head part farther away from the joint line having a second width, measured in the joint direction, which second width at least somewhere is larger than the first width.

23. The article of claim 22, characterized in that the head part has a distal end, when seen from the joint line, being protruding or convex.

24. The article of claim 23, characterized in that the head part has an arrow shape, the arrowhead, with its point distal, constituting the head and the arrowshaft constituting the neck.

25. The article of claim 18, characterized in that more than one hook structure is arranged along the joint line.

26. The article of claim 25, characterized in that the more than one hook structures are arranged symmetrically along the joint line.

27. The article of claim 25, characterized in that only one positive or negative mode type is present on the primary part and the complementary mode type is present on the secondary part.

28. The article of claim 25, characterized in that both positive and negative hook structures are arranged on the primary part and the secondary part.

29. The article of claim 28, characterized in that the positive and negative hook structures are substantially similar in shape to form symmetrical hook structures.

30. The article of claim 18, characterized in that the locking plane on the primary part or the secondary part, and preferably both, is bent or curved.

31. The article of claim 20, characterized in that the curvature is continuous.

32. The article of claim 18, characterized in that at least one of the positive and negative hook structure modes is flexible and deflectable in the normal direction laterally out of the locking plane.

33. The article of claim 32, characterized in that the hook structure is elastic with bias toward the locking plane.

34. The article of claim 18, characterized in that the primary part has a stop surface at least party overlapping the hook structure when seen in the normal direction.

35. The article of claim 18, characterized in that the hook structure at least somewhere has a profile, when moving in the normal direction, which is inclined, curved or sawtoothed.

36. The article of claim 18, characterized in that the hook structures are generally flat with a larger maximum width in the locking plane joint line direction than maximal thickness in the normal direction to the locking plane.

37. The article of claim 18, characterized in that the positive and negative hook structures ate abutting or of small tolerances to give a rigid joint.

38. The article of claim 18, characterized in that the secondary part is partially or completely tubular.

39. The article of claim 38, characterized in that the primary and secondary parts have substantially at least one of the same outer or inner radial extension in the joint plane.

40. The article of claim 18, characterized in that the primary and secondary parts form a container.

41. The article of claim 40, characterized in that the container houses a solid object at least at the locking plane, preferably with a play in at least one of the primary or secondary part less than the hook thickness in the normal direction.

42. The article of claim 40, characterized in that the container houses a second container.

43. The article of claim 42, characterized in that the second container contains a pharmaceutical.

44. The article of claim 42, characterized in that the second container is an injection cartridge.

* * * * *